United States Patent
Park et al.

(10) Patent No.: US 9,008,448 B2
(45) Date of Patent: Apr. 14, 2015

(54) METHOD AND APPARATUS FOR SUCCESSIVELY ENCODING/DECODING IMAGE

(75) Inventors: Sung-bum Park, Seongnam-si (KR); Jung-woo Kim, Seoul (KR); Dai-woong Choi, Seoul (KR); Jae-won Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1389 days.

(21) Appl. No.: 12/557,019

(22) Filed: Sep. 10, 2009

(65) Prior Publication Data

US 2010/0195924 A1    Aug. 5, 2010

(30) Foreign Application Priority Data

Feb. 4, 2009   (KR) .................. 10-2009-0008851

(51) Int. Cl.
*G06K 9/36* (2006.01)
*H04N 19/93* (2014.01)
*H04N 19/15* (2014.01)
*H04N 19/593* (2014.01)
*H04N 19/11* (2014.01)
*H04N 19/136* (2014.01)
*H04N 19/182* (2014.01)
*H04N 19/17* (2014.01)

(52) U.S. Cl.
CPC ............... *H04N 19/93* (2014.11); *H04N 19/15* (2014.11); *H04N 19/593* (2014.11); *H04N 19/11* (2014.11); *H04N 19/136* (2014.11); *H04N 19/182* (2014.11); *H04N 19/17* (2014.11)

(58) Field of Classification Search
USPC .................................. 382/232–253
See application file for complete search history.

(56) References Cited

U.S. PATENT DOCUMENTS

| | | | |
|---|---|---|---|
| 6,760,480 B2 * | 7/2004 | Hata et al. ............ | 382/239 |
| 2002/0094038 A1 * | 7/2002 | Okamura ............ | 375/340 |
| 2006/0133674 A1 * | 6/2006 | Shibata et al. ........ | 382/232 |
| 2008/0310512 A1 * | 12/2008 | Ye et al. ............... | 375/240.16 |

* cited by examiner

*Primary Examiner* — Alex Liew
(74) *Attorney, Agent, or Firm* — Sughrue Mion, PLLC

(57) ABSTRACT

Provided is a method and apparatus for compression encoding/decoding an image based on the repetition of an access unit and the repetition of a residual value.

10 Claims, 9 Drawing Sheets

METHOD AND APPARATUS FOR SUCCESSIVELY ENCODING/DECODING IMAGE

CROSS-REFERENCE TO RELATED PATENT APPLICATIONS

This application claims the benefit of Korean Patent Application No. 10-2009-0008851, filed on Feb. 4, 2009, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding/decoding an image, and more particularly, to a method and apparatus for compression encoding/decoding an image by entropy encoding a residual value.

2. Description of the Related Art

In an image compression method such as MPEG-1, MPEG-2, MPEG-4H.264/MPEG-4 AVC (advanced video coding), an image is divided into a plurality of macro blocks for the purpose of encoding the image. When a predication block is generated by using inter prediction or intra prediction, a residual block is generated by detecting the prediction block from the original block.

The residual values of a residual block are converted to a frequency domain by a discrete cosine transformation (DCT). As a result of the conversion, discrete cosine coefficients are generated and then quantized. The quantized discrete cosine coefficients are entropy encoded by binarization and arithmetic coding schemes, and thus, image data is generated.

In the method of encoding an image in units of blocks, a loss may be generated in the image during the process of quantizing the discrete cosine coefficients. However, to improve the compression rate of an image, the image is encoded using the discrete cosine conversion and quantization schemes in spite of the loss.

According to a lossless image encoding/decoding method such as lossless JPEG, JPEG-LS, or XENA, a pixel value is directly entropy encoded without using the discrete cosine conversion and quantization schemes. Each pixel value is predicted and a prediction value is generated. The prediction value is deducted from the pixel value and thus a residual value with respect to each pixel is generated. Then, the generated residual value is entropy encoded.

Since the lossless image encoding/decoding method does not use the discrete cosine conversion and quantization schemes for compression, an image is compression encoded/decoded by using similarity and regularity in the pixel values of the image. However, when an area such as a texture area having no similarity and regularity between the pixel values is to be encoded, the size of image data after the encoding may become larger than that of image data before the encoding.

SUMMARY OF THE INVENTION

To solve the above and/or other problems, exemplary embodiments of the present invention provide a method and apparatus for compression encoding/decoding an image by entropy encoding a residual value.

The exemplary embodiments of the present invention provide a computer readable recording medium having recorded thereon a program for executing the above method.

According to an aspect of the present invention, a method of encoding an image includes determining whether a current access unit that is presented by a row of a plurality of pixel values is the same as a previously encoded access unit; and selectively entropy encoding a plurality of residual values of the current access unit according to a result of the determination.

The selectively entropy encoding of a plurality of residual values of the current access unit may include first entropy encoding information about the number of repetition of the access unit when the current access unit that is determined to be the same as two or more previously encoded access units, and second entropy encoding the residual values of the current access unit when the current access unit that is determined not to be the same as the two or more previously encoded access units.

The second entropy encoding of the residual values of the current access unit may include determining whether the residual values of the current access unit are able to be compression encoded, and selectively second entropy encoding the residual values according to a result of the determination.

The selectively second entropy encoding of the residual values may include second entropy encoding the residual values of the current access units when the residual values of the current access unit are determined to able to be compression encoded.

The second entropy encoding of the residual values of the current access units may include second entropy encoding a current residual value when the current residual value is determined not to be the same as two or more previously entropy encoded residual values, and third entropy encoding information about the number of repetition of the residual value when the current residual value is determined to be the same as the two or more previously entropy encoded residual values.

According to another aspect of the present invention, a method of decoding an image includes receiving data of a current access unit that is presented by a row of a plurality of pixel values, and determining whether the current access unit is the same as a previously encoded access unit, selectively entropy decoding a plurality of residual values of the current access unit according to a result of the determination, and restoring the pixel values of the current access unit based on a result of the entropy decoding.

According to another aspect of the present invention, an image encoding apparatus includes a determination unit determining whether a current access unit that is presented by a row of a plurality of pixel values is the same as a previously encoded access unit, and an entropy encoding unit selectively entropy encoding a plurality of residual values of the current access unit according to a result of the determination.

According to another aspect of the present invention, an image decoding apparatus includes an entropy decoding unit receiving data of a current access unit that is presented by a row of a plurality of pixel values, determining whether the current access unit is the same as a previously decoded access unit, and selectively entropy decoding a plurality of residual values of the current access unit according to a result of the determination, and a restoration unit restoring the pixel values of the current access unit based on a result of the entropy decoding.

According to another aspect of the present invention, a computer readable recording medium has recorded thereon a program for executing the encoding and/or decoding methods.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Figure 1:
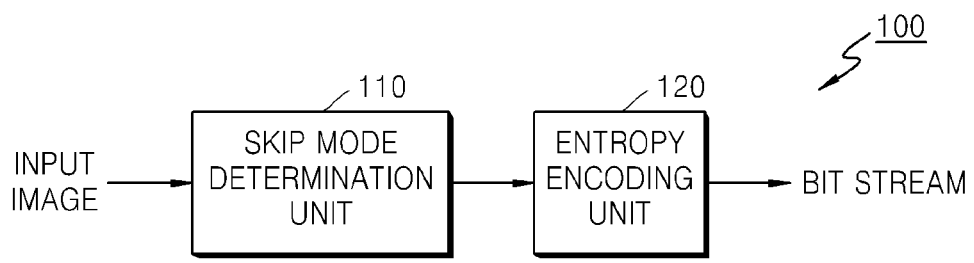
FIG. 1 is a block diagram of an image encoding apparatus according to an exemplary embodiment of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

FIG. 1 is a block diagram of an image encoding apparatus 100 according to an exemplary embodiment of the present invention. Referring to FIG. 1, the image encoding apparatus 100 includes a skip mode determination unit 110 and an entropy encoding unit 120. The skip mode determination unit 110 determines whether a current access unit (AU) is the same as a previously encoded AU. The image encoding apparatus 100 divides an image into at least one AU and efficiently entropy encodes each AU. The AU will be described in detail with reference to FIGS. 2A and 2B.

Figure 2A:
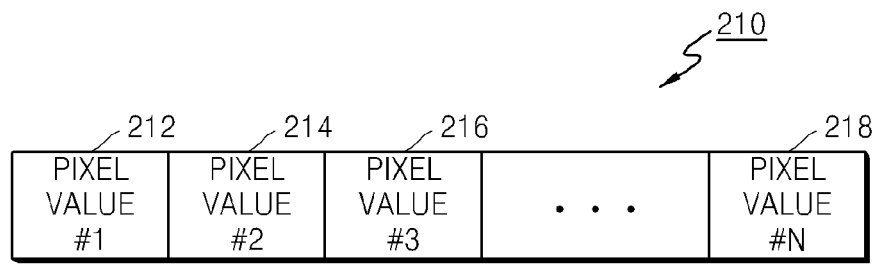
FIGS. 2A and 2B illustrate an access unit according to an exemplary embodiment of the present invention.
Figure 2B:
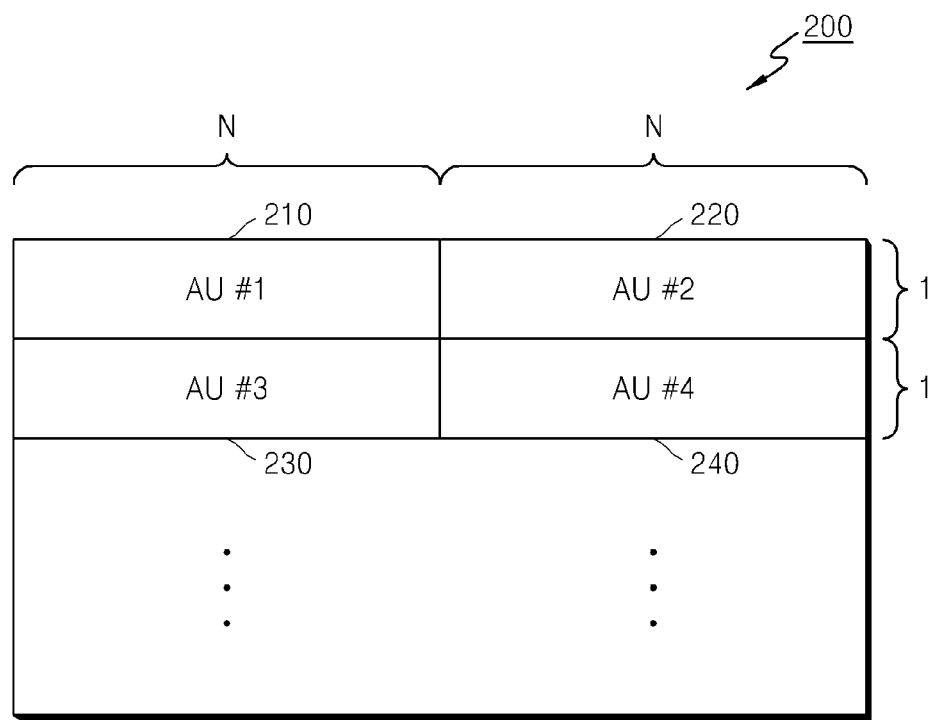

FIGS. 2A and 2B illustrate an AU according to an exemplary embodiment of the present invention. Referring to FIG. 2A, the image encoding apparatus 100 encodes an image by dividing the image into a plurality of AUs that are presented by a row of a plurality of pixels values. In FIG. 2A, an AU 210 includes a row of a plurality of pixel values 212-218.

When an image is processed by being divided into a plurality of block units as in a conventional technology, since the range and number of pixels to be referred to for prediction encoding of the image in units of blocks are large, the size of a memory to be referred to for encoding is large as well. However, in the image encoding apparatus 100 according to the present exemplary embodiment, since the pixel values included in a picture are prediction encoded by being divided by a row, the range and number of pixels to be referred to for encoding are small. Thus, encoding may be performed by referring to a memory having a small size.

As illustrated in FIG. 2B, the image encoding apparatus 100 encodes a picture 200 by dividing the picture 200 into 2×L AUs 210-240 ("L" is the number of rows of a picture). Referring back to FIG. 1, the skip mode determination unit 110 determines whether the current AU is the same as the previously encoded AU. When the same AU is repeated, only the number of repetition of an AU may be entropy encoded without entropy encoding a residual value of the AU. To this end, the skip mode determination unit 110 determines whether the current AU is the same as the previously encoded AU.

The entropy encoding unit 120 selectively entropy encodes the residual values of the current AU according to a result of the determination by the skip mode determination unit 110. When skip mode determination unit 110 determines that the current AU is the same as the previously encoded AU, the entropy encoding unit 120 entropy encodes only the number of repetition of the same AU.

However, when the skip mode determination unit 110 determines that the current AU is not the same as the previously encoded AU, the entropy encoding unit 120 entropy encodes the residual values of the current AU. In doing so, the pixels values 212-218 of the current AU are not entropy encoded as they are, but residual values generated by predicting each of the pixels values 212-218, thereby improving a compression rate. The residual value generated by the prediction and as a result of the prediction will be described in detail with reference to FIG. 5. The data generated when the entropy encoding unit 120 entropy encodes the number of repetition of an AU or the residual values of the current AU, is inserted in a bit stream.

Figure 3:
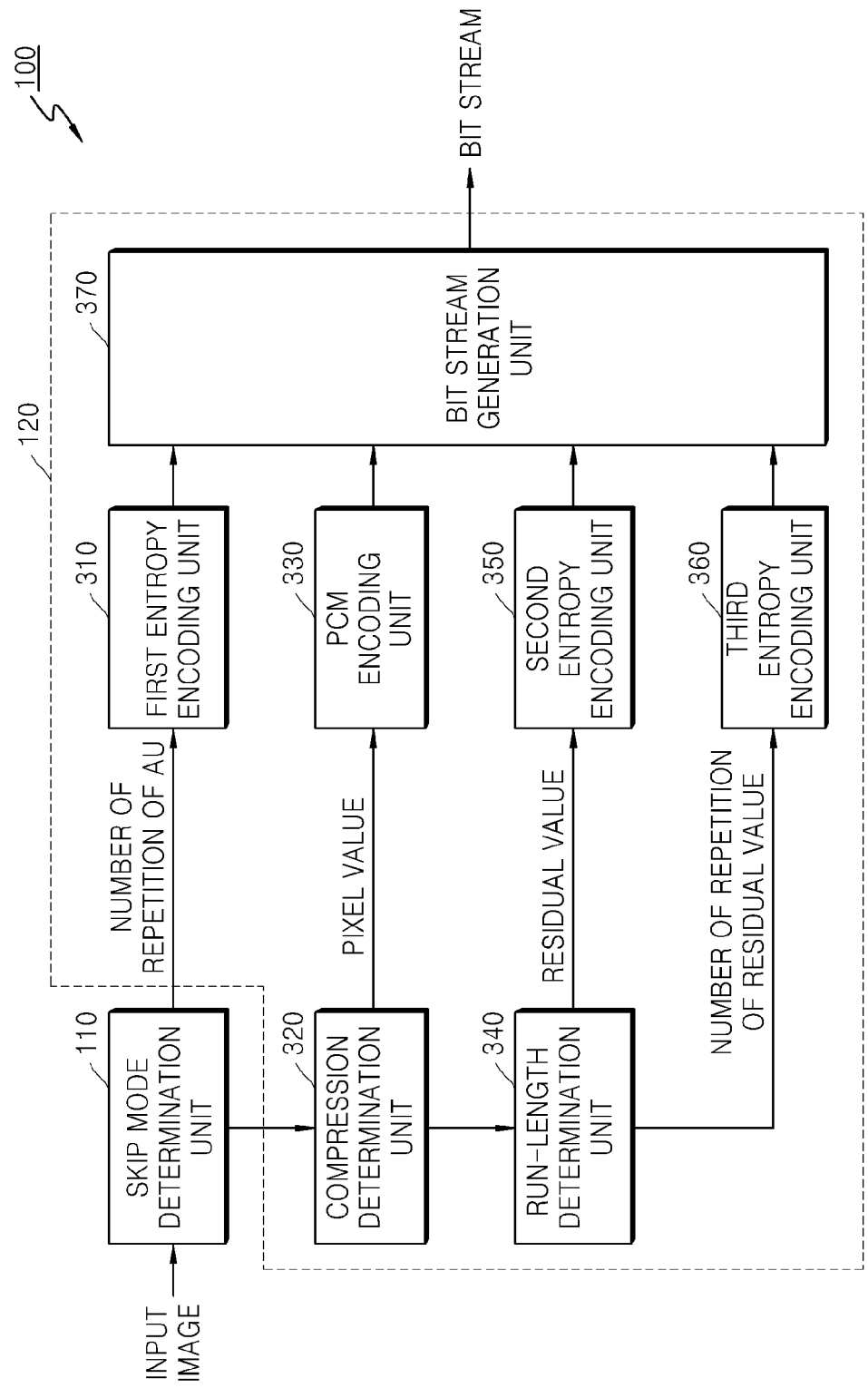
FIG. 3 is a block diagram of an image encoding apparatus according to another exemplary embodiment of the present invention.

FIG. 3 is a block diagram of an image encoding apparatus according to another exemplary embodiment of the present invention. FIG. 3 illustrates in detail the entropy encoding unit 120 of FIG. 1.

Referring to FIG. 3, the entropy encoding unit 120 includes a first entropy encoding unit 310, a compression determination unit 320, a pulse code modulation (PCM) encoding unit 330, a run-length determination unit 340, a second entropy encoding unit 350, a third entropy encoding unit 360, and a bit stream generation unit 370. When the skip mode determination unit 110 determines that the current AU is the same as the previously encoded AU, the first entropy encoding unit 310 entropy encodes the number of repetition of an AU.

Figure 4:
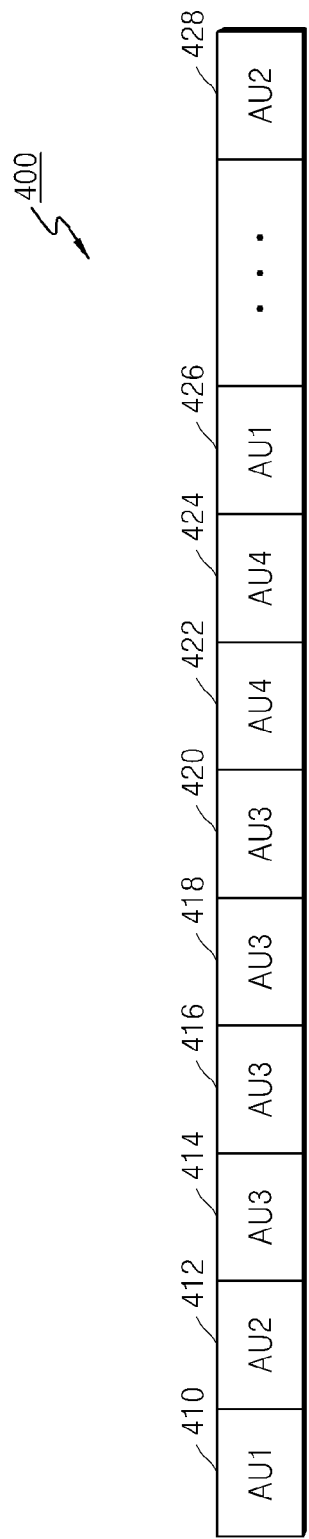
FIG. 4 illustrates a plurality of access units according to an exemplary embodiment of the present invention.

FIG. 4 illustrates a plurality of AUs according to an exemplary embodiment of the present invention. FIG. 4 shows a case in which an image 400 is processed by being divided into a plurality of AUs 410-428.

Referring to FIG. 4, the same AUs 414-420 may be repeated in the image 400. For example, since an AU for a blank of an image has no pixel value or has the same pixel value, the AUs may be all the same. Also, when an image is a document including text, AUs for an edge of the document that does not include text may be all the same. Thus, the first entropy encoding unit 310 entropy encodes only information about the number of repetition of the same AU, that is, the run-length of an AU, when the current AU is the same as the previously encoded AU.

In the example of FIG. 4, when the image encoding apparatus 100 encodes the 5th AU 418, since the current AU 418 is the same as the two AUs 414 and 416 that are previously encoded, the first entropy encoding unit 310 entropy encodes information about a run-length of 2. However, since the same AU is repeated in the next AU, that is, the 6th AU 420, the information about a run-length of 2 in the current AU 418 is not inserted in a bit stream.

When the image encoding apparatus 100 encodes the 6th AU 420, since the current AU 420 is the same as the three AUs 414, 416, and 418 that are previously encoded, the first entropy encoding unit 310 entropy encodes the information about a run-length of 3 and inserts the information in the bit stream. The number of repetition of an AU, that is, the information about a run-length, is entropy encoded according to an exponential-Golomb code. In other words, the same AUs 414-420 of FIG. 4 are encoded as data generated by entropy encoding the 3rd AU 414 and data generated by entropy encoding run-length of 3 according to the exponential-Golomb code.

Also, according to another exemplary embodiment of the present invention, the information about the number of repetition of an AU may be encoded only when the current AU is the same as the previously encoded two or more AUs. When the entropy encoding is performed by entropy encoding the run-length of an AU whose number of repetition is smaller than a predetermined number, redundancy is generated due to data by the run-length so that a compression rate of image encoding may be rather lowered.

Accordingly, when the current AU is the same as only one previously encoded AU, the information about the number of repetition of an AU is not entropy encoded by using the first entropy encoding unit 310 and the encoding is performed by using other encoding modules 330-360. For example, when the AU that is currently encoded by the image encoding apparatus 100 is the 8th AU 424, although the current AU is the same as the previously encoded AU 422, the first entropy encoding unit 310 does not entropy encode the information about a run-length of 1, but the 8th AU 424 is entropy encoded in the same manner as that performed to the 7th AU 422.

Referring back to FIG. 3, when the skip mode determination unit 110 determines that the current AU is not the same as the previously encoded AU or is the same as only one previously encoded AU, the compression determination unit 320 determines whether the current AU can be compression encoded.

When the residual values of the current AU is entropy encoded according to the Huffman code, it is determined whether data of the current AU is compressed. It is determined whether the amount of data obtained by entropy encoding the residual values of the current AU according to the Huffman code is smaller than that of data of a pixel value of the current AU.

The residual values of the current AU are entropy encoded multiple times using a plurality of Huffman code tables. The amount of data generated as a result of each of the entropy encodings may be compared to data of a pixel value of the current AU. The residual values of the current AU may be generated by using an adjacent pixel value as a prediction value, which will be described in detail with reference to FIG. 5.

Figure 5:
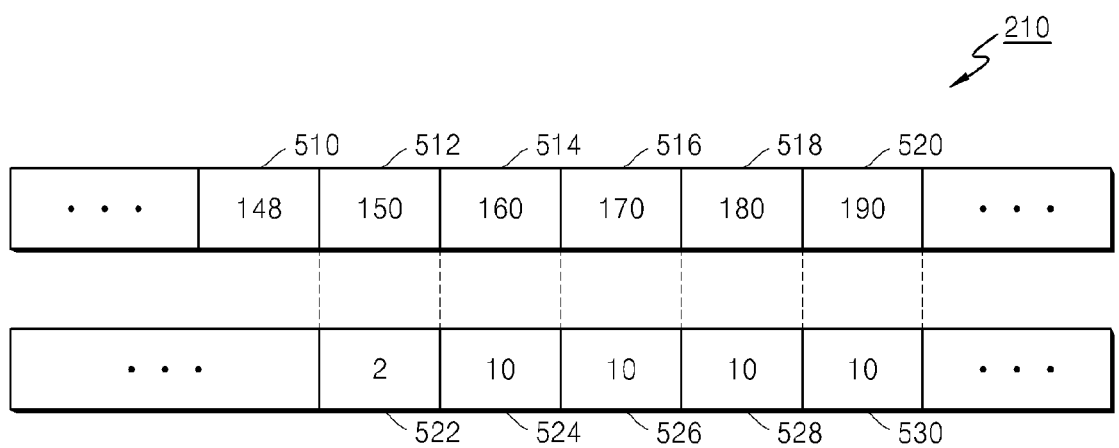
FIG. 5 illustrates an access unit according to an exemplary embodiment of the present invention.

FIG. 5 illustrates an AU according to an exemplary embodiment of the present invention. Referring to FIG. 5, a current AU 210 includes a plurality of pixel values 510-520. Residual values 522-530 included in the current AU 210 may be generated by prediction using an adjacent pixel value.

When the residual value 522 is generated by predicting the pixel value 512 using the pixel value 510 located adjacent to the left of the pixel value 512, the residual value 522 is generated, which is 2 (=150−148). Likewise, when the residual value 524 is generated by predicting the pixel value 514 using the pixel value 512 located adjacent to the left of the pixel value 514, the residual value 524 is generated, which is 10 (=160−150). By repeating the prediction using the pixel value located adjacent to the left thereof, the residual values 522-530 of the current AU are generated.

Since the AU is represented as a row of a plurality of pixel values and the only the pixel value located adjacent to the left thereof is used in generating the residual values of the AU, a prediction method may be simplified and thus complexity of hardware may be greatly reduced. Also, since the number of pixels needed to refer to is small, the size of a memory needed for prediction is small accordingly.

Referring back to FIG. 3, when the compression determination unit 320 determines that the residual values of the current AU cannot be compression encoded, the PCM encoding unit 330 PCM encodes the pixel values of the current AU as they are. The pixel values are converted to a binary row according to the amount of each pixel value. In an uncompressed AU, an overflow phenomenon that the amount of image data rather increases as a result of the image encoding may be prevented by PCM encoding the pixel values as they are.

When the compression determination unit 320 determines that the residual values of the current AU can be compression encoded, the run-length unit 340 determines whether the same residual values of an AU are repeated. According to the present exemplary embodiment, as in the case in which the AU is repeated, when the same residual values are repeated in a single AU, the image encoding apparatus 100 increases the compression rate of image encoding by using the above-described run-length encoding of FIG. 4.

To this end, the run-length determination unit 340 determines whether the current residual value is the same as the previously entropy encoded residual value in the current AU. When the run-length determination unit 340 determines that the current residual value is not the same as the previously entropy encoded residual value in the current AU, the second entropy encoding unit 350 entropy encodes the current residual value according to the Huffman code.

However, when the run-length determination unit 340 determines that the current residual value is the same as the previously entropy encoded residual value, the third entropy encoding unit 360 entropy encodes the number of repetition of the same residual value. The number of repetition of the residual value is entropy encoded in the same manner as a method of entropy encoding the number of repetition of an AU, which will be described with reference to FIG. 5.

In an example of FIG. 5, when the image encoding apparatus 100 encodes the 4th residual value 528, since the current residual value 528 is the same as the two residual values 524 and 526 that are previously encoded, the second entropy encoding unit 350 entropy encodes the number of repetition residual value, that is, information about a run-length of 2, not the residual value 528. However, since the same value is repeated at the next residual value, that is, the 5th residual value 530, the information about a run-length of 2 at the current residual value 528 is not inserted in the bit stream.

When the image encoding apparatus 100 encodes the 5th residual value 530, since the current residual value 530 is the same as the three residual values 524-528 that are previously encoded, the second entropy encoding unit 350 entropy encodes information about a run-length of 3.

As in the case of entropy encoding the number of repetition of an AU, the information about run-length may be entropy encoded according to the exponential-Golomb code. Also, since the information about the number of repetition of residual values is encoded only when the current residual value is the same as the previously encoded two or more residual values, redundancy generated by entropy encoding the run-length even when the number of repetition is smaller than predetermined number may be reduced.

Referring back to FIG. 3, the second entropy encoding unit 350 and the third entropy encoding unit 370 repeat entropy encoding of the residual value or the information about the number of repetition until all residual values of the current AU are entropy encoded. The bit stream generation unit 370 generates and outputs a bit stream of the current AU based on at least one of the information about the number of repetition of an AU that is entropy encoded by the first entropy encoding unit 310, the pixel values of the current AU that is PCM encoded by the PCM encoding unit 330, the residual values that is entropy encoded by the second entropy encoding unit 350, and the information about the number of repetition of the same residual value that is entropy encoded by the third entropy encoding unit 360.

Figure 6:
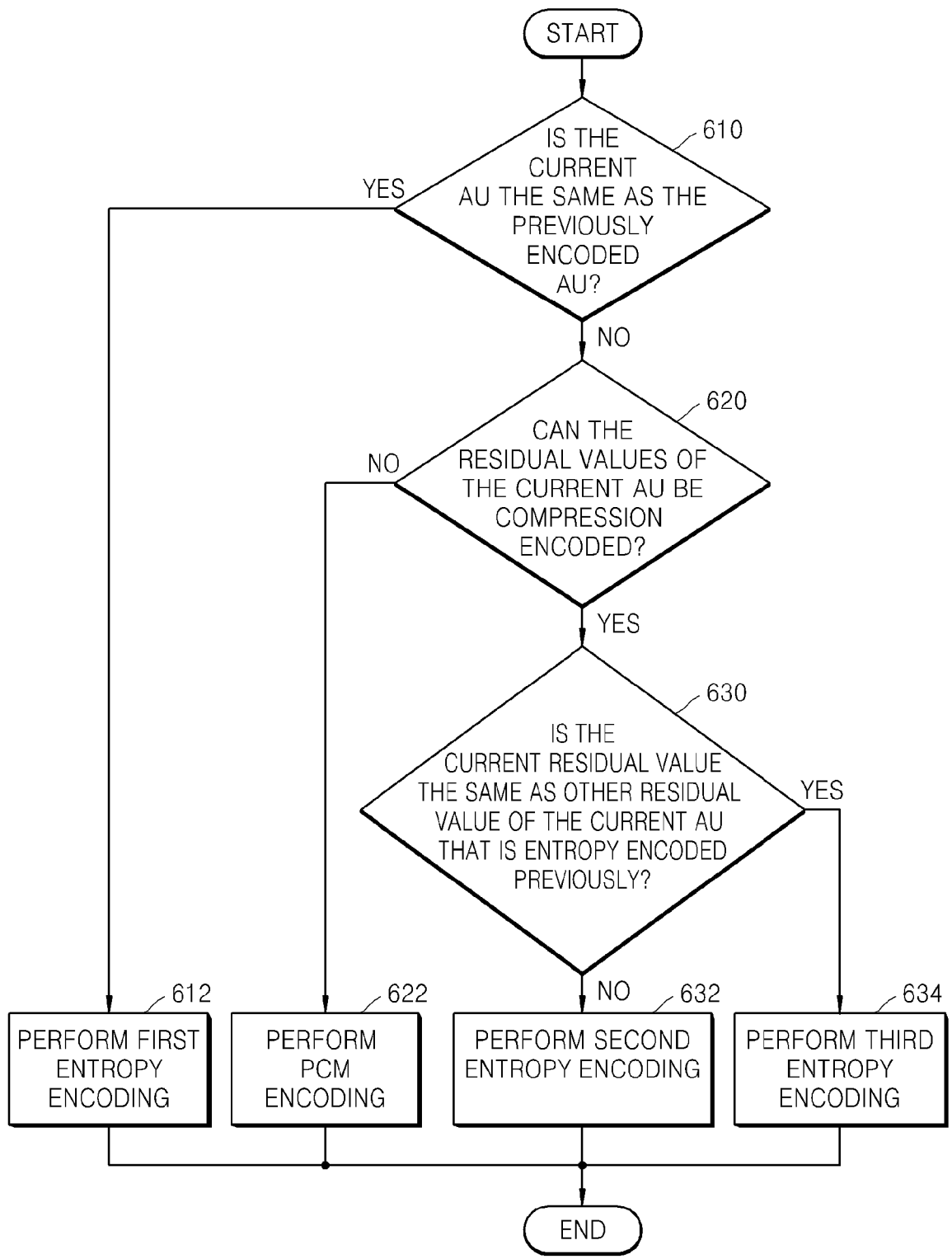
FIG. 6 is a flowchart for explaining a method of encoding an image according to an exemplary embodiment of the present invention.

FIG. 6 is a flowchart for explaining a method of encoding an image according to an exemplary embodiment of the present invention. Referring to FIG. 6, in Operation 610, the image encoding apparatus 100 according to the present exemplary embodiment determines whether the current AU is the same as the previously encoded AU. When the same AU is repeated, the residual value of the AU is not entropy encoded, but only the number of repetition of an AU may be entropy encoded.

In Operation 612, the image encoding apparatus 100 entropy encodes the information about the number of repetition of an AU. When the current AU is determined in the operation 610 to be the same as the previously encoded AU, the information about the number of repetition of the same AU is entropy encoded. The number of repetition of an AU is entropy encoded according to the exponential-Golomb code.

As described above in relation to FIGS. 3 and 4, the information about the number of repetition of an AU may be entropy encoded only when the current AU is the same as the previously encoded two or more AUs. Also, when the AU encoded next to the current AU is the same as the current AU, the information about the number of repetition at the current AU may not be inserted in the bit stream.

In Operation 620, the image encoding apparatus 100 determines whether the residual values of the current AU may be compression encoded. It is determined whether the amount of data generated as result of the entropy encoding of the residual values of the current AU using the Huffman code is smaller than the amount of data generated as a result of the PCM encoding of the pixel values of the current AU as they are.

In Operation 622, the image encoding apparatus 100 PCM encodes the pixel values of the current AU. When the PCM encoding of the pixel values of the current AU as they are has a higher compression rate than the encoding of the residual values of the current AU, the pixel values of the current AU are converted to a binary row according to the amount of each pixel value.

In Operation 630, the image encoding apparatus 100 determines whether the current residual value is the same as other residual value of the current AU that is entropy encoded previously. When the current residual value is determined in the operation 630 not to be the same as other residual value of the current AU that is entropy encoded previously, the residual value is second entropy encoded as it is, by using the Huffman code. When the current residual value is determined in the operation 630 to be the same as other residual value of the current AU that is entropy encoded previously, the information about the number of repetition of a residual value is third entropy encoded according to the exponential-Golomb code.

The method of entropy encoding the number of repetition of a residual value is the same as the method of entropy encoding the number of repetition of an AU. The information about the number of repetition of a residual value may be entropy encoded only when the current residual value is the same as the previously entropy encoded two or more residual values. Also, when the next residual value that is encoded after the current residual value is the same as the current residual value, the information about the number of repetition may not be inserted in the bit stream. The image encoding apparatus 100 repeats the operations 600-634 until all residual values of the current AU are encoded.

Figure 7:
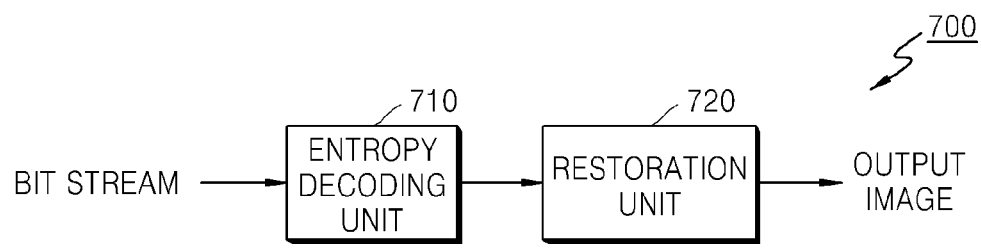
FIG. 7 is a block diagram of an image decoding apparatus according to an exemplary embodiment of the present invention.

FIG. 7 is a block diagram of an image decoding apparatus 700 according to an previously embodiment of the present invention. Referring to FIG. 7, the image decoding apparatus 700 includes an entropy decoding unit 710 and a restoration unit 720. The entropy decoding unit 710 receives data of the current AU that is presented in a row of pixel values and determines whether the current AU is the same as the previously decoded AU.

It is determined whether the data about the current AU may include only the information about the number of repetition of the same AU, based on head information included in the data of the current AU. When the current AU is the same as the previously decoded AU, the current AU may be restored by entropy decoding only the information about the number of repetition. When the current AU is not the same as the previously decoded AU, the residual values of the current AU are entropy decoded.

The restoration unit 720 restores the pixel values of the current AU based on a result of the entropy decoding by the entropy decoding unit 710. When the entropy decoding unit 710 determines that the current AU is the same as the previously entropy decoded AU, the pixel values of the current AU are restored by using the previously entropy decoded AU.

However, when the entropy decoding unit 710 does not determine that the current AU is the same as the previously entropy decoded AU, the pixel values of the current AU are restored based on the residual values of the current AU that is entropy decoded. The method of restoring the pixel values from the residual values is the same as that performing the above-described prediction encoding of FIG. 5 in reverse order.

Figure 8:
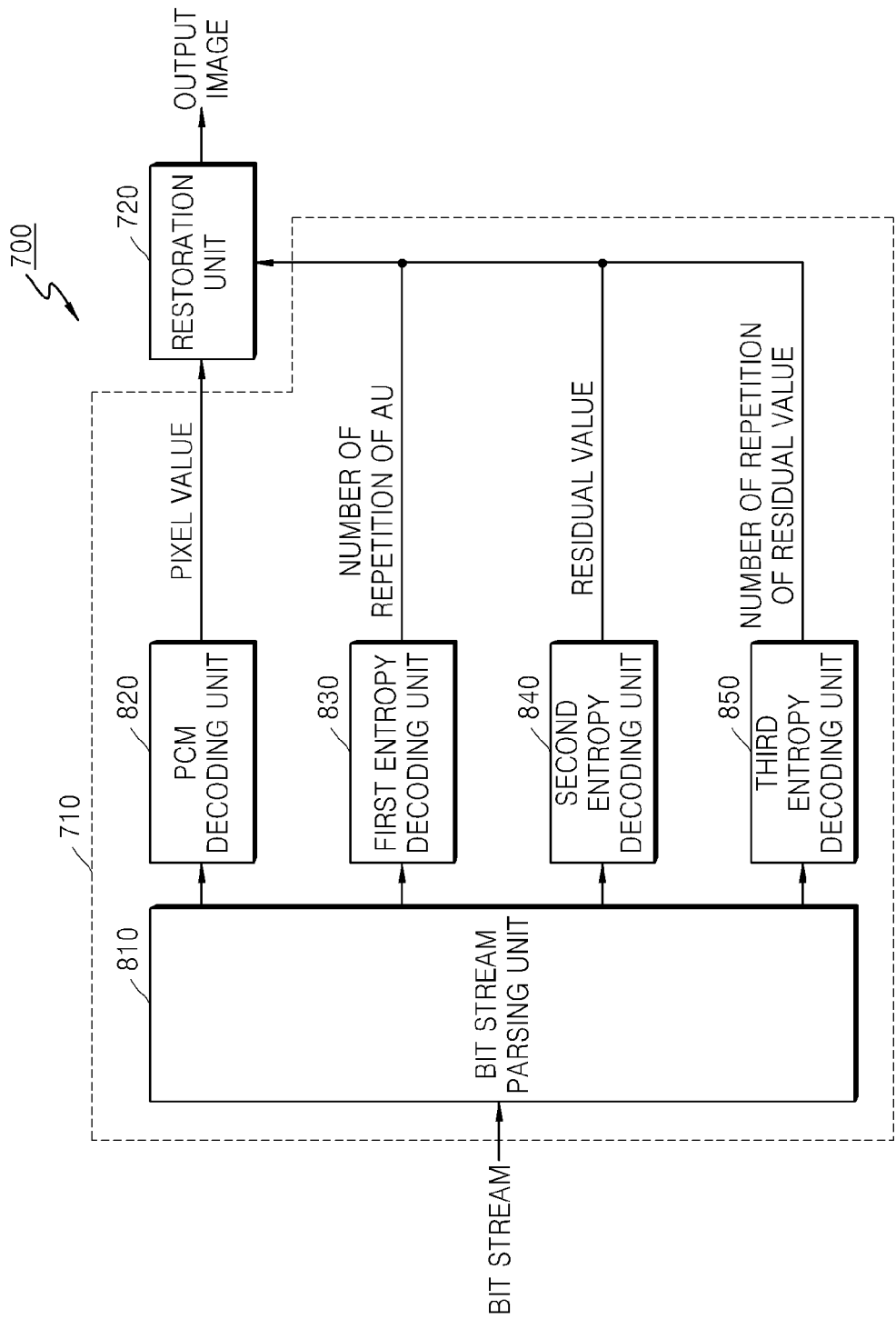
FIG. 8 is a block diagram of an image decoding apparatus according to another exemplary embodiment of the present invention.

FIG. 8 is a block diagram of the image decoding apparatus 700 according to another exemplary embodiment of the present invention. FIG. 8 illustrates in detail the entropy decoding unit 710 of FIG. 7. Referring to FIG. 8, the entropy decoding unit 710 according to the present exemplary embodiment includes a bit stream parsing unit 810, a PCM decoding unit 820, a first entropy decoding unit 830, a second entropy decoding unit 840, and a third entropy decoding unit 850.

The bit stream parsing unit 810 receives data of the current AU, parses the received data, and extracts data of the number of repetition of an AU, data of the pixel values of an AU, data of the residual values of an AU, or data of the number of repetition of a residual value.

The PCM decoding unit 820 PCM decodes the data of the pixel values of the current AU received from the bit stream parsing unit 810. When the current AU is determined not to be compression encoded as a result of the parsing by the bit stream parsing unit 810, the data of the pixel values are PCM decoded.

When the current AU is determined to be the same as the previously entropy decoded AU, as a result of the parsing by the bit stream parsing unit 810, the first entropy decoding unit 830 receives the information about the number of repetition of an AU from the bit steam parsing unit 810 and entropy decodes the received information. When the pixel values of the current AU are the same as the pixel values of the previously decoded AU, only the information about the number of repetition of the same AU is entropy decoded so that the current AU may be restored. The information about the number of repetition of an AU is entropy decoded according to the exponential-Golomb code.

When the current AU is determined not to be the same as the previously entropy decoded AU, as a result of the parsing by the bit stream parsing unit 810, the second entropy decoding unit 840 and the third entropy decoding unit 850 receive the data of residual values of current AU from the bit stream parsing unit 810 and entropy decode the received data. The second entropy decoding unit 840 and the third entropy decoding unit 850 entropy decode the residual values of the current AU by repeating the entropy decoding in units of pixels.

When the current residual value is determined not to be the same as the previously entropy decoded other residual value of the current AU, as a result of the parsing by the bit stream parsing unit 810, the second entropy decoding unit 840 entropy decodes the current residual value according to the Huffman code. When the current residual value is determined to be the same as the previously entropy decoded other residual value of the current AU, as a result of the parsing by the bit stream parsing unit 810, the third entropy decoding unit 850 entropy decodes the information about the number of repetition of a residual value according to the exponential-Golomb code.

The restoration unit 720 restores the current AU based on at least one of the pixel values of the current AU that are PCM decoded by the PCM decoding unit 820, the information about the number of repetition of the AU that is entropy decoded by the first entropy decoding unit 830, the residual values of the current AU that is decoded by the second entropy decoding unit 840, and the information about the number of repetition of the residual value that is entropy decoded by the third entropy decoding unit 850.

When the residual values of the current AU are entropy decoded by the second entropy decoding unit 840 and the third entropy decoding unit 850, the restoration unit 720 restores the pixel values by performing prediction based on the residual values restored by the restoration unit 720. The method of restoring the pixel values from the residual values is the same as that performing the above-described prediction encoding of FIG. 5 in reverse order.

Figure 9:
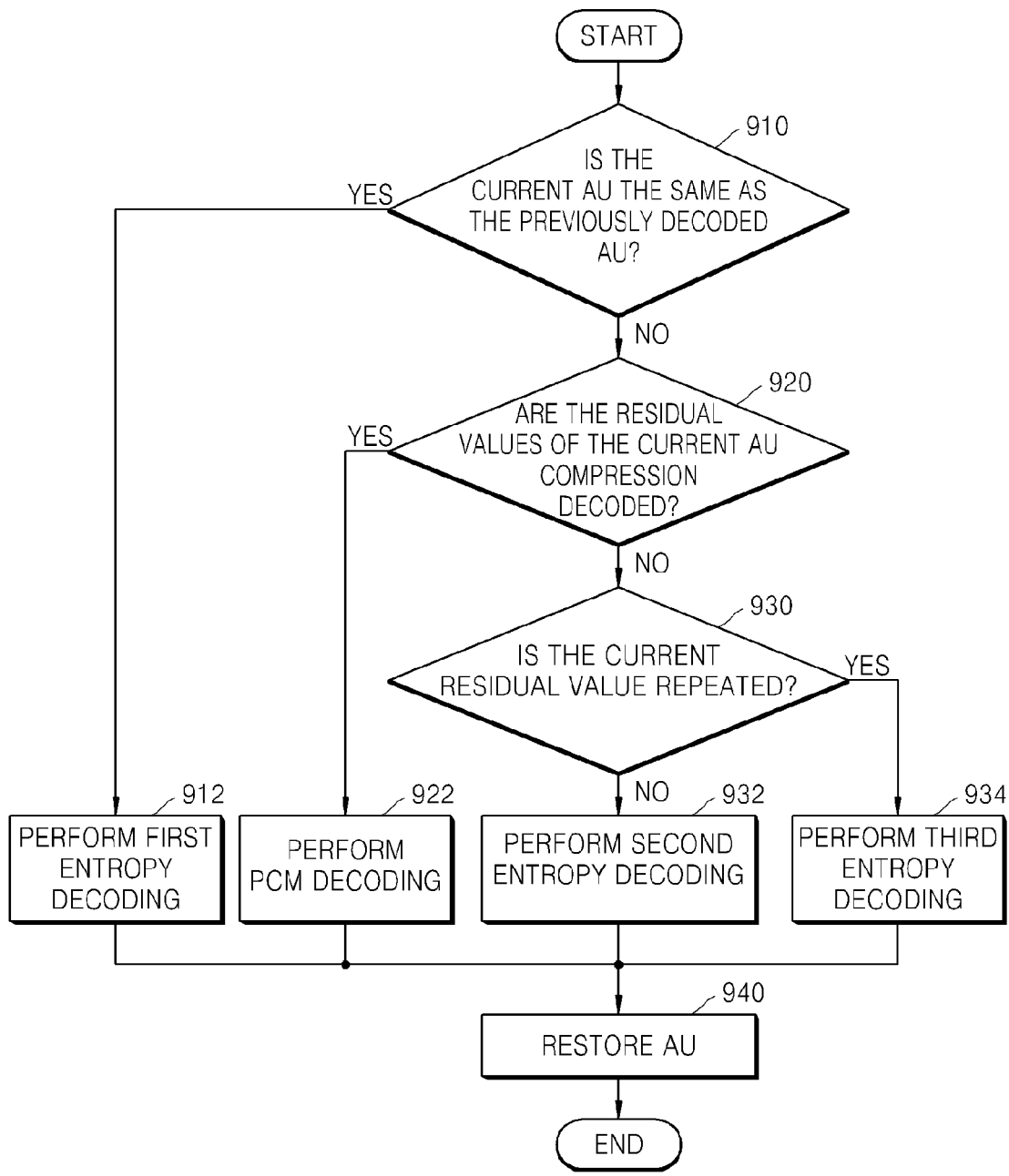
FIG. 9 is a flowchart for explaining a method of decoding an image according to an exemplary embodiment of the present invention.

FIG. 9 is a flowchart for explaining a method of decoding an image according to an exemplary embodiment of the present invention. Referring to FIG. 9, in operation 910, the image decoding apparatus 700 of the present exemplary embodiment determines whether the current AU is the same as the previously decoded AU. The data of the current AU is received and the received data is parsed so that information included in a header portion may be referred to for the determination.

In Operation 912, the image decoding apparatus 700 entropy decodes the information about the number of repetition of an AU. When the current AU is determined in the operation 910 to be the same as the previously entropy decoded AU, the information about the number of repetition of an AU is entropy decoded according to the exponential-Golomb code.

In Operation 920, the image decoding unit 700 determines whether the current AU is compression encoded. When the current AU is determined in the operation 910 not to be the same as the previously entropy decoded AU, the image decoding apparatus 700 determines whether the pixel values of the current AU is PCM encoded or the residual values are entropy encoded.

In Operation 922, when the current AU is determined in the operation 920 not to be compression encoded, the image decoding apparatus 700 PCM decodes the data of the pixel values of the current AU. In Operations 930, 932, and 934, the residual values of the current AU are entropy decoded.

In Operation 930, the image decoding apparatus 700 determines whether the current residual value is the same as the other previously entropy decoded residual value of the current AU. When the current residual value is not the same as the previously entropy decoded other residual value of the current AU, in Operation 932, the image decoding apparatus 700 second entropy decodes the current residual value according to the Huffman code.

When the current residual value is the same as the previously entropy decoded other residual value of the current AU, in Operation 934, the image decoding apparatus 700 third entropy decodes the information about the number of repetition of a residual value according to the exponential-Golomb code. The operations 930-934 are repeated until all residual values of the current AU are decoded.

In the operation 940, the image decoding apparatus 700 restores the current AU based on at least one of the information about the number of repetition of the AU that is first entropy decoded in the operation 912, the pixel values of the current AU that are PCM decoded in the operation 922, the residual values of the current AU that is second entropy decoded in the operation 932, and the information about the number of repetition of the residual value that is third entropy decoded in the operation 934.

While this invention has been particularly shown and described with reference to exemplary embodiments thereof, it will be understood by those skilled in the art that various changes in form and details may be made therein without departing from the spirit and scope of the invention as defined by the appended claims.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

For example, the image encoding apparatus and the image decoding apparatus according to the above-described exemplary embodiments may include a bus coupled to each of units of the apparatus as illustrated in FIGS. 1 and 3, and 7 and 8, and at least one processor coupled to the bus. Also, the image encoding apparatus and the image decoding apparatus may include a memory coupled to the bus to store commands, received messages, or generated messages, and coupled to the at least one process to execute the above-described commands.

What is claimed is:

1. A method of decoding an image, the method comprising:
receiving data of a current access unit of a row of a plurality of pixel values, and determining whether pixel values of the current access unit are the same as pixel values of at least one previously encoded access unit;
selectively entropy decoding a plurality of residual values of the current access unit according to a result of the determining; and
restoring the plurality of pixel values of the current access unit based on a result of the selectively entropy decoding.

2. The method of claim 1, wherein the selectively entropy decoding of the plurality of residual values of the current access unit comprises:
first entropy decoding information about a number of repetition of the current access unit if the current access unit is determined to be the same as the at least one previously decoded access unit, the at least one previously decoded access unit being at least two previously decoded access units; and
second entropy decoding the residual values of the current access unit if the current access unit is determined not to be the same as the at least two previously decoded access units.

3. The method of claim 2, wherein the first entropy decoding of information about the number of repetition of the access unit comprises first entropy encoding the number of repetition of the access unit according to an exponential Golomb code.

4. The method of claim 2, wherein the second entropy decoding of the residual values of the current access unit comprises:
determining whether the residual values of the current access unit are compression encoded; and
selectively second entropy decoding the residual values according to a result of the determining.

5. The method of claim 4, wherein the selectively second entropy decoding of the residual values comprises second entropy decoding the residual values of the current access unit if the residual values of the current access unit are determined to be compression encoded.

6. The method of claim 5, wherein the second entropy decoding of the residual values of the current access unit comprises:
second entropy decoding a current residual value if the current residual value is determined not to be the same as two or more previously entropy decoded residual values; and
third entropy decoding information about the number of repetition of the residual value if the current residual value is determined to be the same as the two or more previously entropy decoded residual values.

7. The method of claim 6, wherein the second entropy decoding of a current residual value comprises second entropy decoding the current residual value according to a Huffman code.

8. The method of claim 6, wherein the third entropy decoding of information about the number of repetition of the residual value comprises third entropy decoding information about the number of repetition of the residual value according to an exponential Golomb code.

9. An image decoding apparatus comprising:
an entropy decoding unit which receives data of a current access unit of a row of a plurality of pixel values, determines in a determination, whether pixel values of the current access unit are the same as pixel values of a previously decoded access unit, and selectively entropy decodes a plurality of residual values of the current access unit according to a result of the determination; and
a restoration unit which restores the plurality of pixel values of the current access unit based on a result of the selective entropy decoding.

10. A non-transitory computer readable recording medium having recorded thereon a program for executing the method defined in claim 1.

* * * * *